United States Patent
Lin et al.

(10) Patent No.: US 8,665,364 B2
(45) Date of Patent: Mar. 4, 2014

(54) REINFORCEMENT STRUCTURE FOR WAFER-LEVEL CAMERA MODULE

(75) Inventors: Wei-Feng Lin, Hsinchu (TW); Wen-Jen Ho, Qionglin (TW); Chi-Kuei Lee, Bade (TW); Chen-Wei Tsai, Xinfu (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 350 days.

(21) Appl. No.: 13/099,905

(22) Filed: May 3, 2011

(65) Prior Publication Data

US 2011/0317065 A1    Dec. 29, 2011

Related U.S. Application Data

(60) Provisional application No. 61/358,819, filed on Jun. 25, 2010.

(51) Int. Cl.
  *H04N 5/225*    (2006.01)
  *H01L 31/0203*  (2006.01)

(52) U.S. Cl.
  USPC .......................... 348/374; 257/433; 250/239

(58) Field of Classification Search
  USPC .................................................. 348/374–375
  See application file for complete search history.

(56) References Cited

U.S. PATENT DOCUMENTS

| | | | |
|---|---|---|---|
| 6,480,346 B2 * | 11/2002 | Funakoshi .................... 359/808 |
| 7,405,764 B2 * | 7/2008 | Gustavsson et al. .......... 348/374 |
| 7,422,382 B2 * | 9/2008 | Seo ............................... 396/529 |
| 7,469,100 B2 * | 12/2008 | Toor et al. ..................... 396/144 |
| 7,525,081 B2 * | 4/2009 | Toyoda et al. ............. 250/208.1 |
| 7,763,855 B2 * | 7/2010 | Hayashi et al. ........... 250/339.01 |
| 2005/0190283 A1 * | 9/2005 | Ish-Shalom et al. .......... 348/340 |
| 2005/0285973 A1 * | 12/2005 | Singh et al. .................... 348/374 |
| 2009/0212218 A1 * | 8/2009 | Hayashi et al. ............ 250/338.1 |
| 2011/0013901 A1 * | 1/2011 | Utsugi .......................... 396/529 |

FOREIGN PATENT DOCUMENTS

| | | |
|---|---|---|
| CN | 1670559 A | 9/2005 |
| CN | 101405872 A | 4/2008 |
| CN | 202394027 U | 8/2012 |
| JP | 2007274624 A | 10/2007 |

OTHER PUBLICATIONS

CN 201110165204.7—First Chinese Office Action and Search Report, dated Jul. 15, 2013 with English translation (14 pages).
TW 100118721—ROC (Taiwan) Office Action and Search Report, received Nov. 7, 2013 (8 pages).
TW 100118721—ROC (Taiwan) Office Action and Search Report with English Translation, issued Nov. 5, 2013 (14 pages).

* cited by examiner

*Primary Examiner* — Ngoc-Yen Vu
(74) *Attorney, Agent, or Firm* — Blakely Sokoloff Taylor & Zafman LLP

(57) ABSTRACT

An example reinforcement structure for protecting a wafer-level camera module includes a top sheet element and a side sheet element. The top sheet element is to be disposed over a top surface of the camera module and includes a first opening for allowing light to pass through to the camera module. The side sheet element is coupled to the top sheet element for securing the reinforcement structure to a printed circuit board (PCB). A second opening in the side sheet element is included to allow an adhesive to be dispensed through the second opening to adhere the reinforcement structure to the camera module.

15 Claims, 7 Drawing Sheets

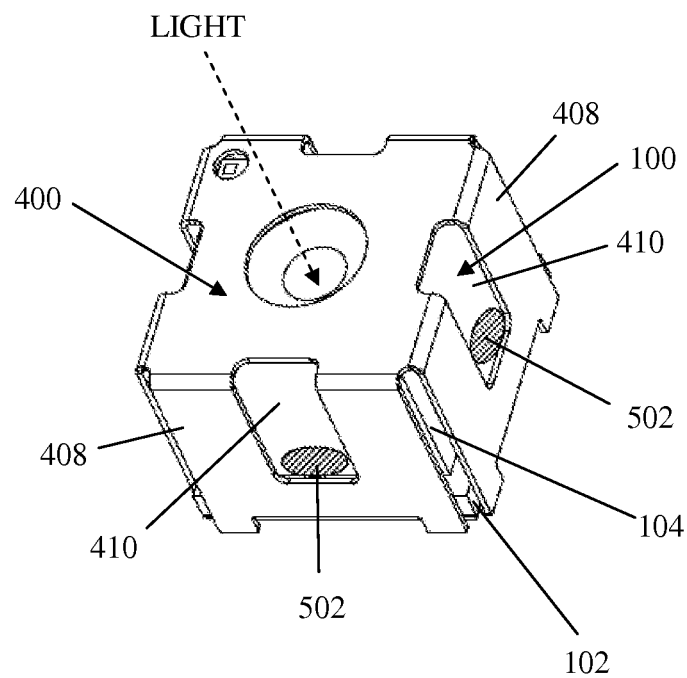
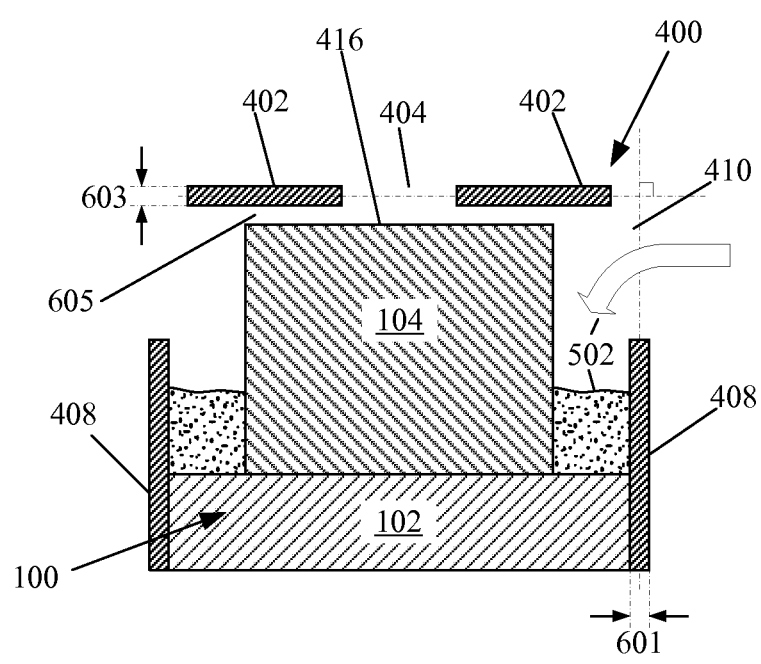

REINFORCEMENT STRUCTURE FOR WAFER-LEVEL CAMERA MODULE

CROSS-REFERENCE TO RELATED APPLICATION

This application claims the benefit of U.S. Provisional Application No. 61/358,819 filed Jun. 25, 2010, hereby incorporated by reference.

TECHNICAL FIELD

This disclosure relates generally to wafer-level camera modules, and in particular but not exclusively, relates to reinforcement of wafer-level camera modules.

BACKGROUND INFORMATION

Digital cameras are widely used in various applications. Recently, digital cameras become smaller in size to fit in emerging applications such as mobile phones, security and automobile cameras, medical devices, etc. A digital camera includes a lens to form an image, and an image sensor to capture the formed image and converse it into an electrical signal.

Camera modules for many applications are required to have a low manufacturing cost and small horizontal and vertical footprints. These may be manufactured and assembled using wafer level technology to produce wafer-level camera modules. Many if not all of the optical components are manufactured on silicon, glass or plastic wafers. The opto-wafers may be mounted together with an image sensor wafer (e.g., CMOS image sensor wafer), and the resultant wafer stack diced into individual camera modules. The complete camera, including the optics, may be manufactured and packaged at the wafer level using available semiconductor technology.

A wafer-level camera module typically includes a sensor package having an image sensor (e.g., CMOS image sensor) in the package. A lens cube that holds a lens or a combination of lenses in the cube is disposed on the top of the sensor package. On the other hand, an integrated housing may hold a lens or lenses and an image sensor as well.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 5 is a perspective view of a reinforcement structure disposed over a wafer-level camera module, in accordance with an embodiment of the invention.

FIG. 6 is a sectional side-view of a reinforcement structure glued to a camera module, in accordance with an embodiment of the invention.

DETAILED DESCRIPTION

Embodiments of a system and method for reinforcement of a wafer-level camera module are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
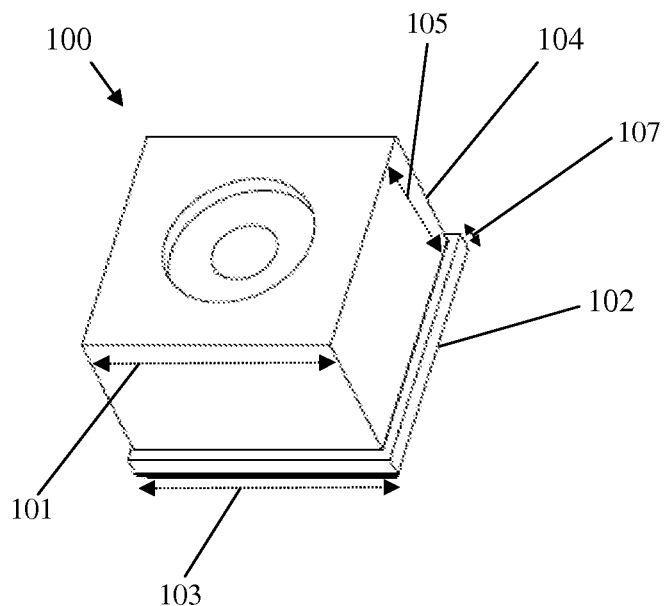
FIG. 1 is a perspective view of a wafer level camera module having a lens cube and a sensor package.

FIG. 1 is a perspective view of a wafer-level camera module 100 having a lens cube 104 and a sensor package 102. Lens cube 104 is shown in FIG. 1 as disposed on the top of sensor package 102. In one example, the thickness 107 of sensor package 102 may be less than the thickness 105 of lens cube 104, and the cross-section 103 of sensor package 102 may be larger than the cross-section 101 of lens cube 104, as shown in FIG. 1. In another embodiment, the cross-sections of sensor package 102 and lens cube 104 may be substantially identical. Furthermore, other size and shape combinations are possible. In some instances, without additional reinforcement, camera module 100 is susceptible mechanical stress, caused by shocks, impacts, shear forces and the like. For example, an impact may cause camera module 100 to fall apart or elements inside the camera module such as lenses and image sensor (not shown) to become misaligned.

Figure 2:
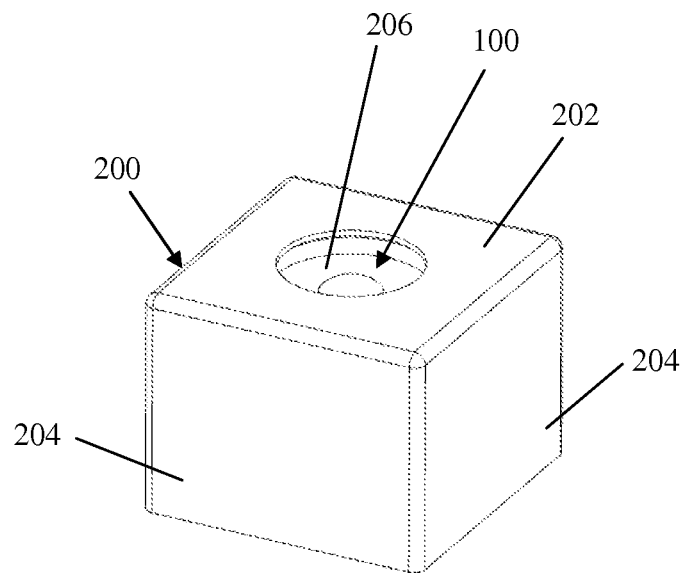
FIG. 2 is a perspective view of a prior art metal enclosure for EMI protection.

FIG. 2 is a perspective view of a prior art metal enclosure for EMI protection. As shown in FIG. 2, camera module 100 is enclosed by an enclosure 200 to protect camera module 100 from electro-magnetic interference (EMI). To provide protection from EMI, enclosure 200 is made of metal and enclosure 200 has no opening except one for light passing through such that no electro-magnetic field can penetrate the enclosure.

Enclosure 200 has a top sheet element 202 and four side walls 204. Side walls 204 have no openings. Top sheet element 202 has a central opening 206 to allow light to get in camera module 100. While enclosure 200 may sufficiently protect camera module 100 from EMI, enclosure 200 may not properly and sufficiently provide adequate structural reinforcement of camera module 100, because the enclosure and the camera module are not strongly bonded, as will be described in more detail below.

Figure 3:
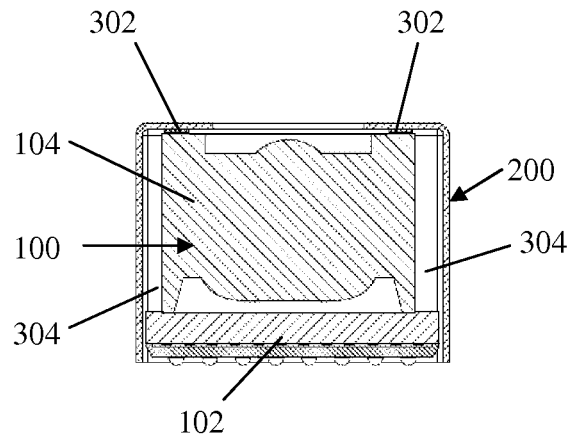
FIG. 3 is a sectional side-view of a prior art metal enclosure mounted to a camera module.

FIG. 3 is a sectional side-view of prior art metal enclosure 200 mounted to camera module 100. As shown in FIG. 3, enclosure 200 is covering camera module 100, primarily for EMI protection. Enclosure 200 is mounted to the camera module by: (1) dispensing glue 302 on the top surface of lens cube 104, (2) disposing enclosure 200 over camera module 100 by surface-to-surface mating, and (3) curing glue 302. By this prior-art process, space 304 between enclosure 200 and lens cube 104 and sensor package 102 is not properly and sufficiently filled with glue. Thus, enclosure 200 and camera module 100 are not strongly bonded. Even worse, glue 302 on the top of lens cube 104 may have varying thickness causing a variation of space between the bottom edge of enclosure 200 and a base, such as, a printed circuit board (PCB). Thus, enclosure 200 may not be properly and strongly fixed to the PCB.

Accordingly, embodiments of the present invention include a reinforcement structure for increasing the structural integrity of a wafer-level camera module. In some embodiments a reinforcement structure is utilized that includes openings in side sheet elements to allow an adhesive to be dispensed through the opening for adhering the reinforcement structure to the camera module on its sides. In another embodiment, the reinforcement structure is glued to the camera module without any glue on a top surface of the camera module to reduce the variations in spacing between the bottom of the reinforcement structure and the PCB, as discussed above. In yet another embodiment, short side sheet elements are included in the reinforcement structure that are configured to conform to the lens cube to provide direct structural support to the lens cube. These and other embodiments are described in more detail below.

Figure 4:
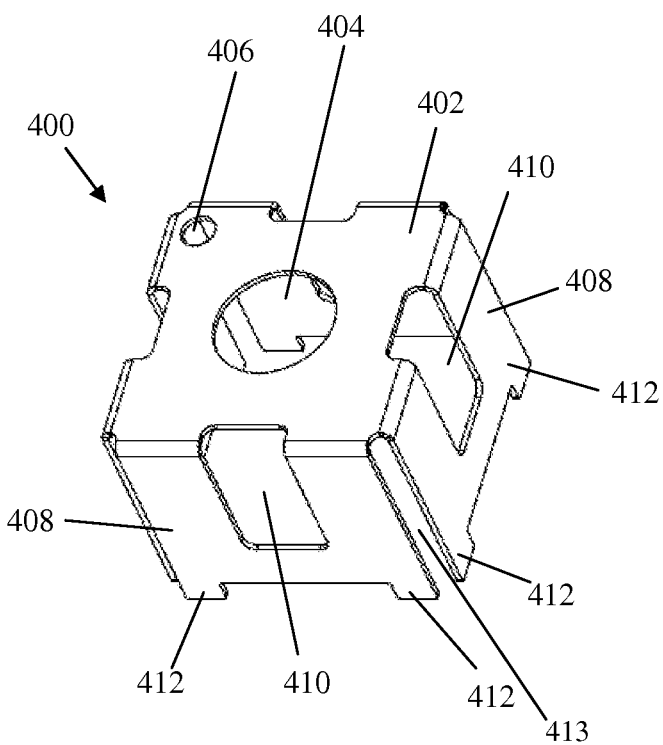
FIG. 4 is a perspective view of a reinforcement structure, in accordance with an embodiment of the invention.

FIG. 4 is a perspective view of a reinforcement structure 400, in accordance with an embodiment of the invention. The illustrated example of reinforcement structure 400 has a quadrilateral top sheet element 402 (i.e., four sides) for protecting and reinforcing a camera module (e.g., camera module 100). In one embodiment top sheet element 402 is a rectangular top sheet element. As shown in FIG. 4, top sheet element 402 has a central opening 404 for allowing incident light to pass through to camera module 100 (shown in FIG. 1). Top sheet element 402 may have other openings, such as opening 406, which may serve as an orientation mark for assembly of reinforcement structure 400 with camera module 100, and/or for orienting the camera module when mounting to a PCB.

As shown, reinforcement structure 400 further includes four side sheet elements 408, where each side sheet element 408 is coupled to a respective side of top sheet element 402. In one embodiment, each side sheet element 408 extends substantially perpendicular from top sheet element 402. Side sheet elements 408 are for protecting and reinforcing the camera module (e.g., camera module 100) and for securing reinforcement structure 400 to the PCB. In one example, side sheet elements 408 include legs 412 for soldering the side sheet element 408 to the PCB. In the illustrated embodiment, adjacent side sheet elements 408 are spaced apart at each side edge 413 of reinforcement structure 400, such that side sheet elements 408 are connected to top sheet element 402 and not to one another.

Each side sheet element 408 is further illustrated as including an opening 410 configured to allow an adhesive to be dispensed through the opening for adhering reinforcement structure 400 to camera module 100. Although FIG. 4 illustrates each side sheet element 408 as including a single opening 410, each side sheet element 408 may include any number of openings 410, including one or more, in accordance with the teachings herein. Each opening 410 may be configured as a slot (i.e., a narrow opening) in side sheet element 408. As shown in the embodiment of FIG. 4, opening 410 is a slot in side sheet element 408 and in top sheet element 402. That is, opening 410 may extend over the top of reinforcement structure 400 to provide a high angle dispensing path for glue and/or to provide better viewing of the glue for post dispensing quality checks.

The openings 410 of the reinforcement structure 400 reduce the total weight of the structure while providing sufficient reinforcement. Furthermore, the openings provide convenience, efficacy, and efficiency in dispensing glue between the reinforcement structure and the camera module. Reinforcement structure 400, including top sheet element 402 and side sheet elements 408, may be made of metal or other materials.

FIG. 5 is a perspective view of reinforcement structure 400 disposed over wafer-level camera module 100, in accordance with an embodiment of the invention. After reinforcement structure 400 is disposed over camera module 100, an adhesive, such as glue 502, is dispensed on camera module 100 through openings 410. Glue 502 will fill the space between side sheet element 408 and camera module 100. After properly curing glue 502, reinforcement structure element 400 and camera module 100 are strongly bonded together. It is appreciated that at least one side sheet element 408 of reinforcement structure 400 is glued to camera module 100.

FIG. 6 is a sectional side-view of reinforcement structure 400 glued to camera module 100, in accordance with an embodiment of the invention. As shown in FIG. 6, glue 502 is dispensed through opening 410 for adhering reinforcement structure 400 to camera module 100. In particular, glue 502 is dispensed on a top surface of sensor package 102, between a side of lens cube 104 and side sheet element 408.

As mentioned previously with respect to FIGS. 2 and 3, prior art methods typically disposed glue 302 on top surface (e.g., top surface 416) of camera module 100. However, glue 302 may have varying thicknesses which results in a variations of space between the bottom edge of enclosure 200 and the PCB. Accordingly, in an embodiment of the present invention, reinforcement structure 400 may be disposed over a top surface 416 of camera module 100 free of adhesive therebetween. That is, reinforcement structure 400 is glued to camera module 100 through opening 410, where there exists a gap 605 between top surface 416 and top sheet element 402, and where no glue is present in gap 605.

FIG. 6 illustrates various other aspects of reinforcement structure 400, in accordance with embodiments of the invention. For example, top sheet element 402 may include a thickness 603 that is substantially equal to a thickness 601 of side sheet element 408.

Figure 7:
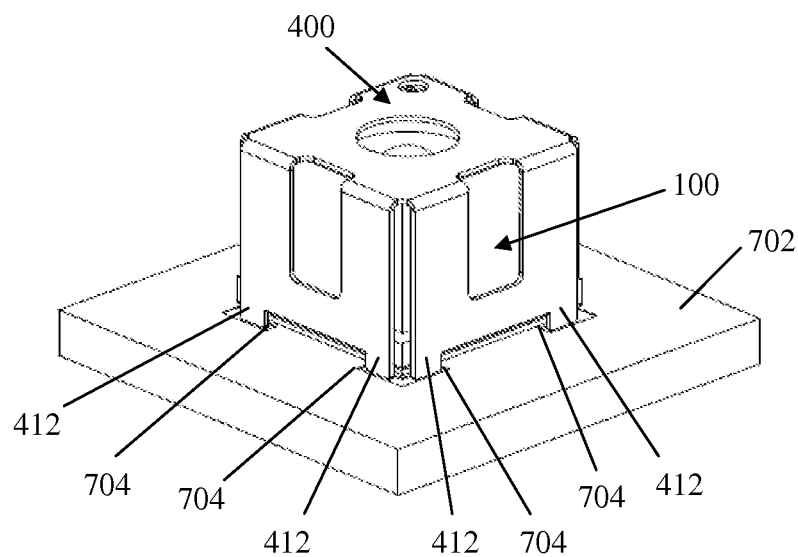
FIG. 7 is a perspective view of a reinforcement structure disposed over a wafer-level camera module and mounted to a printed circuit board (PCB), in accordance with an embodiment of the invention.

FIG. 7 is a perspective view of reinforcement structure 400 disposed over wafer-level camera module 100 and mounted to a printed circuit board (PCB) 702, in accordance with an embodiment of the invention. FIG. 7 shows that after reinforcement structure 400 is mounted to camera module 100, legs 412 of reinforcement structure 400 are soldered to solder pads 704 on PCB 702. In some implementations, side sheet elements 408 may have continuous bottoms instead of legs (e.g., no legs). In this case, the bottom edges of side sheet elements 408 are soldered to solder pads on PCB 702. Furthermore, although the figures illustrate each side sheet element 408 as including two legs 412, each side sheet element 408 may include any number of legs 412 including one or more, in accordance with the teachings herein. Wafer-level camera module 100 is also mounted and soldered to PCB 702. It is appreciated that at least one side sheet element is soldered to PCB 702.

Figure 8:
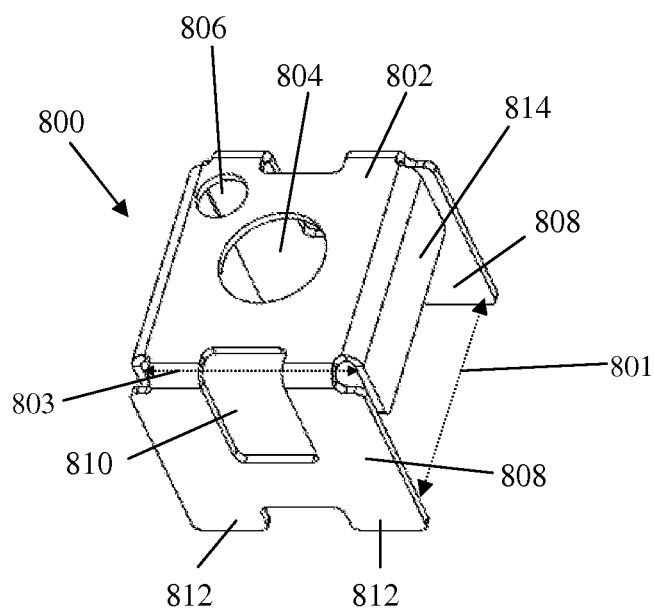
FIG. 8 is a perspective view of a reinforcement structure having short side sheet elements, in accordance with an embodiment of the invention.

FIG. 8 is a perspective view of a reinforcement structure 800 having long side sheet elements 808 and short side sheet elements 814, in accordance with an embodiment of the invention. The illustrated example of reinforcement structure 800 has a quadrilateral top sheet element 802 (i.e., four sides) for protecting and reinforcing a camera module (e.g., camera module 100). In one embodiment top sheet element 802 is a rectangular top sheet element. As shown in FIG. 8, top sheet element 802 has a central opening 804 for allowing incident light to pass through to camera module 100 (shown in FIG. 1). Top sheet element 802 may have other openings, such as opening 806, which may serve as an orientation mark for assembly of reinforcement structure 800 with camera module 100, and/or for mounting of the camera module onto a PCB.

As shown, reinforcement structure 800 further includes two long side sheet elements 808 and two short side sheet elements 814, where each side sheet element is coupled to a respective side of top sheet element 802. In one embodiment, each side sheet element 808 and 814 extends substantially perpendicular from top sheet element 802. Side sheet elements 808 and 814 are for protecting and reinforcing the camera module (e.g., camera module 100). However, short side sheet elements 814 leave openings underneath and are not configured to extend all the way to the PCB. In one embodiment a pair of short side sheet elements 814 are configured to conform to lens cube 104 of sensor package 100 to provide structural support directly to lens cube 104, while long side sheet elements 808 are configured to conform to sensor package 102. Thus, a distance 801 between two facing long side sheet elements 808 on two opposite sides of top sheet element 802 may be greater than a distance 803 between two facing short side sheet elements 814 on another two opposite sides of top sheet element 802. Distance 803 between two short side sheet elements 814 may match dimension 101 of lens cube 104 and distance 801 may match dimension 103 of sensor package 102.

Long side sheet elements 808 are further for securing reinforcement structure 800 to the PCB. In one example, long side sheet elements 808 include legs 812 for soldering the long side sheet element 808 to the PCB. In the illustrated embodiment, adjacent side sheet elements are spaced apart at each side edge of reinforcement structure 800, such that side sheet elements 808 and 814 are connected to top sheet element 802 and not to one another. A long side sheet element 808 may have two legs 812. Reinforcement structure 800 may be made of metal or other materials.

Each long side sheet element 808 is further illustrated as including an opening 810 configured to allow an adhesive to be dispensed through the opening for adhering reinforcement structure 800 to camera module 100. Although FIG. 8 illustrates each long side sheet element 808 as including a single opening 810, each long side sheet element 808 may include any number of openings 810, including one or more, in accordance with the teachings herein. Each opening 810 may be configured as a slot (i.e., a narrow opening) in long side sheet element 808. As shown in the embodiment of FIG. 8, opening 810 is a slot in long side sheet element 808 and in top sheet element 802. That is, opening 810 may extend over the top of reinforcement structure 800 to provide a high angle dispensing path for glue and/or to provide better viewing of the glue for post dispensing quality checks.

Figure 9:
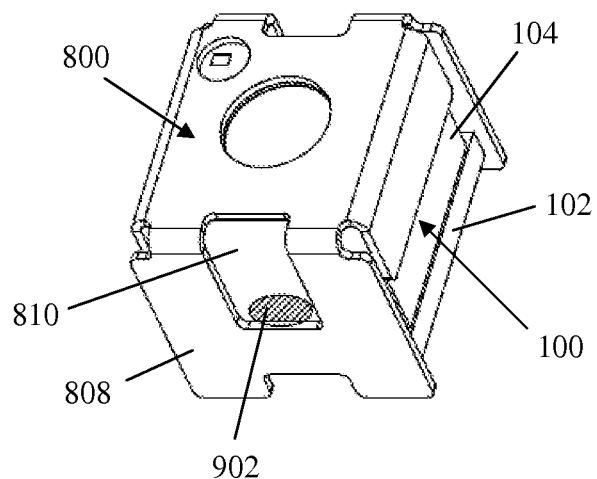
FIG. 9 is a perspective view of a reinforcement structure having short side sheet elements disposed over a wafer-level camera module, in accordance with an embodiment of the invention.

FIG. 9 is a perspective view of a reinforcement structure 800 having short side sheet elements 814 disposed over wafer-level camera module 100, in accordance with an embodiment of the invention. After reinforcement structure 800 is disposed over camera module 100, an adhesive, such as glue 902, is dispensed on camera module 100 through openings 810 of long side sheet elements 808. Glue 902 will fill the space between long side sheet element 808 and camera module 100. After properly curing glue 902, reinforcement structure element 800 and camera module 100 are strongly bonded together. It is appreciated that at least long one side sheet element 808 of reinforcement structure 800 is glued to camera module 100.

Figure 10:
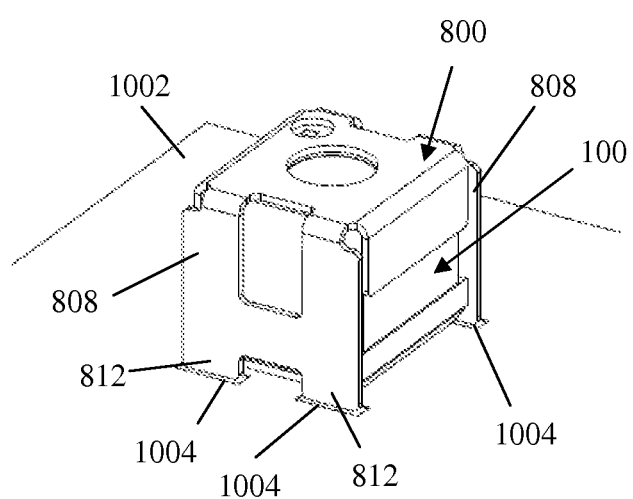
FIG. 10 is a perspective view of a reinforcement structure having short side sheet elements disposed over a wafer-level camera module and mounted to a PCB, in accordance with an embodiment of the invention.

FIG. 10 is a perspective view of a reinforcement structure having short side sheet elements disposed over a wafer-level camera module and mounted to a PCB, in accordance with an embodiment of the invention. FIG. 10 shows that after reinforcement structure 800 is mounted to camera module 100, legs 812 of long side sheet elements 808 are soldered to solder pads 1004 on PCB 1002. In some implementations, long side sheet elements 808 may have continuous bottoms instead of legs (e.g., no legs). In this case, the bottom edges of long side sheet elements 808 are soldered to solder pads on PCB 1002. Furthermore, although the figures illustrate each long side sheet element 808 as including two legs 812, each long side sheet element 808 may include any number of legs 812 including one or more, in accordance with the teachings herein. Wafer-level camera module 100 is also mounted and soldered to PCB 1002. It is appreciated that at least one long side sheet element 808 is soldered to PCB 1002.

Figure 11:
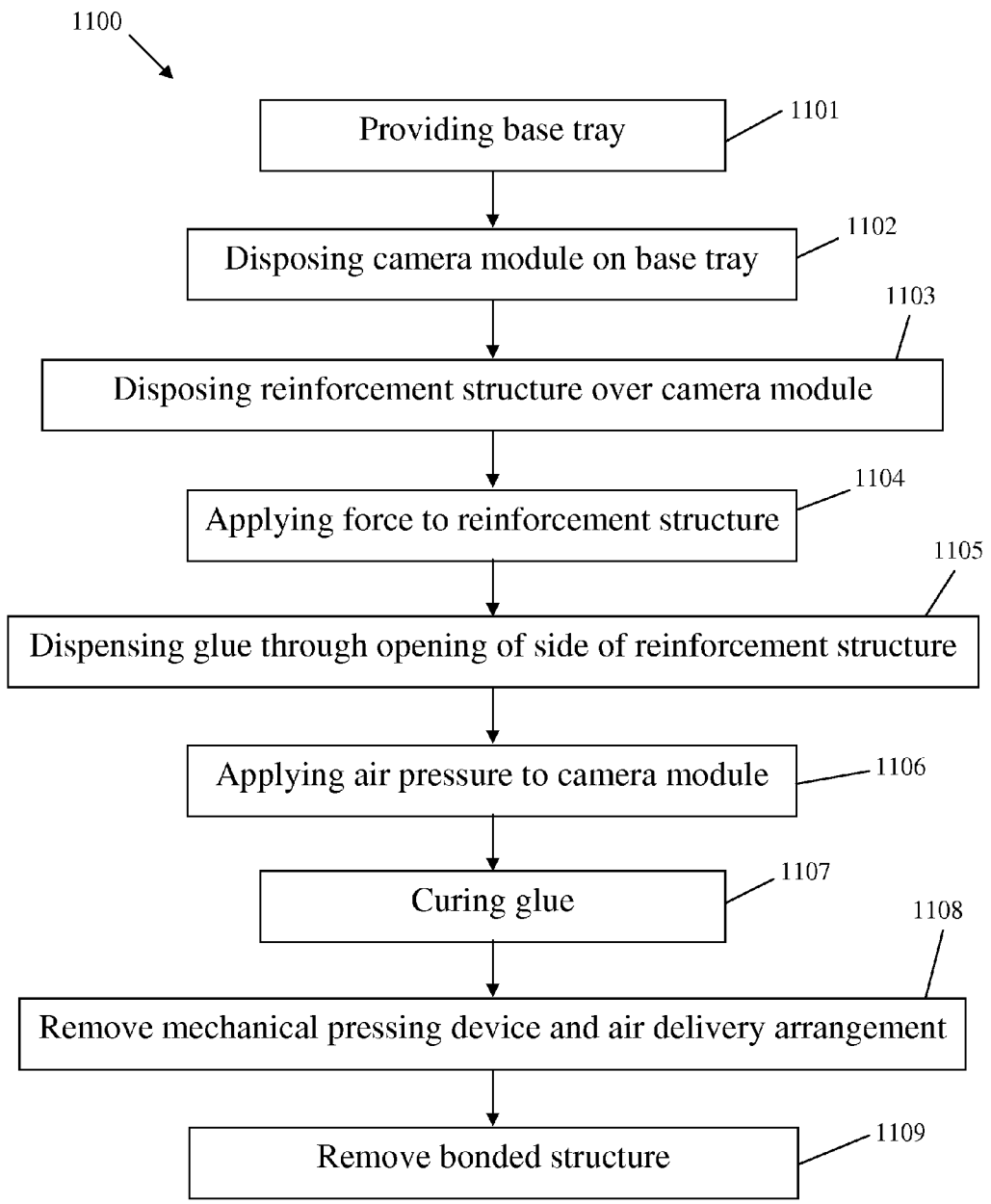
FIG. 11 is a flowchart illustrating a process of mounting a reinforcement structure over a camera module, in accordance with an embodiment of the invention.
Figure 12:
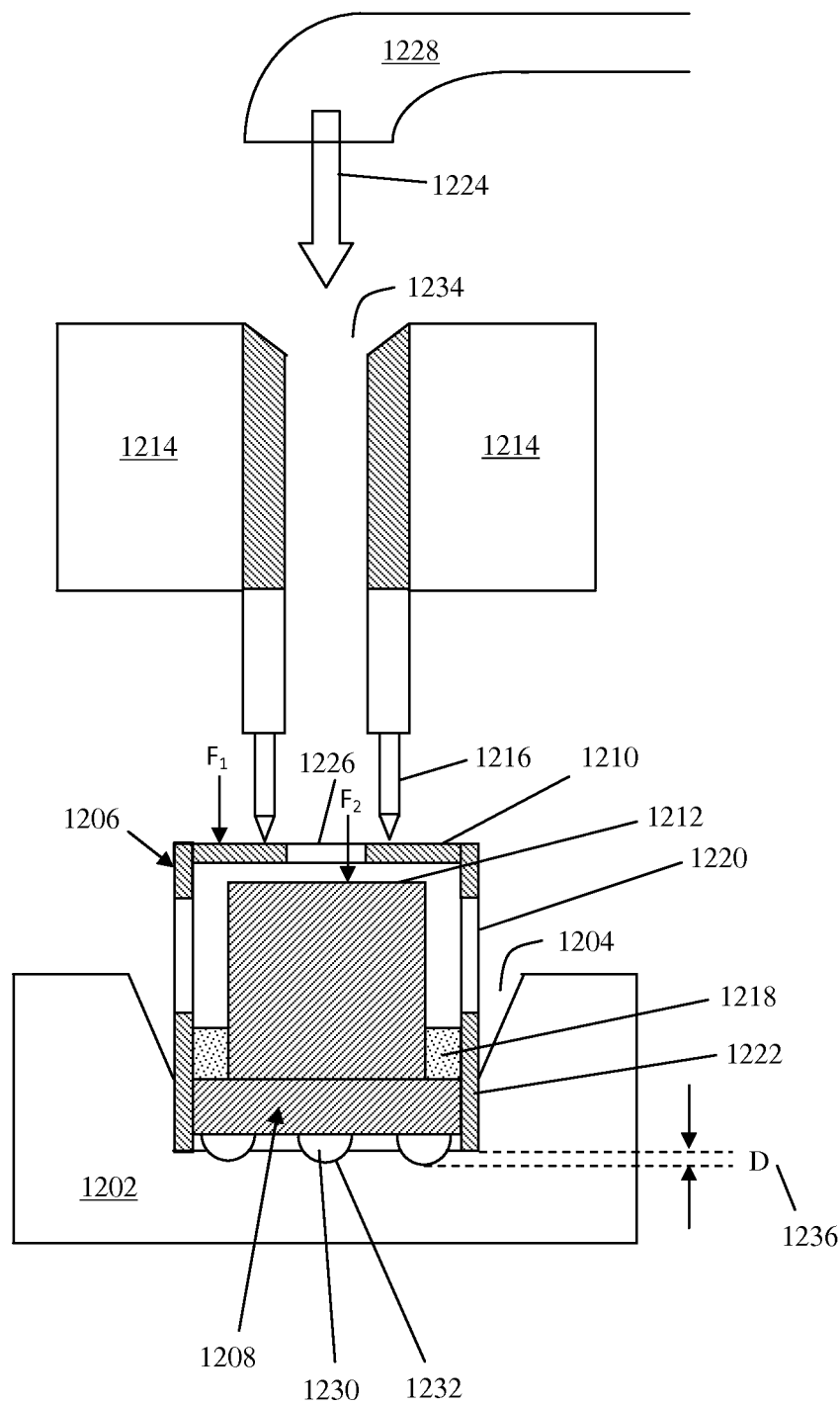
FIG. 12 is a sectional view of an apparatus for mounting a reinforcement structure to a camera module, in accordance with an embodiment of the invention.

FIGS. 11 and 12 illustrate a process 1100 and apparatus for mounting a reinforcement structure 1206 to a wafer-level camera module 1208, in accordance with an embodiment of the invention. Process 1100 will be described with reference to both FIGS. 11 and 12.

In step 1101, a base tray 1202 having cavities 1204 is provided. Each cavity 1204 is configured to conform to the size and shape of reinforcement structure 1206 and camera module 1208. In step 1102, camera module 1208 is disposed on base tray 1202 within cavity 1204. In step 1103, reinforcement structure 1206 is disposed on base tray 1202 over camera module 1208. In step 1104, a force $F_1$ is applied to a top sheet element 1210 of reinforcement structure 1206 such that reinforcement structure 1206 is in contact with base tray 1202. For example, a mechanical pressing device 1214 having press pins 1216 positions press pins 1216 on top sheet element 1210 of reinforcement structure 1206. It is appreciated that at least one press pin provides the force $F_1$. In step 1105, glue 1218 is dispensed through openings 1220 of side sheet elements 1222 of reinforcement structure 1206. In step 1106, force $F_2$ is applied to top surface 1212 of camera module 1208 by way of air pressure created by a stream of air 1224 through an opening 1234 of mechanical pressing device 1214 and through central opening 1226 of top sheet element 1210 to hold camera module 1208 firmly against base tray 1202 and to prevent movement of camera module 1208. Air 1224 is delivered by an air delivery arrangement 1228. Forces $F_1$ and $F_2$ are applied and maintained at least until glue 1218 is cured enough to secure reinforcement structure 1206 to camera module 1208.

In step 1107, glue 1218 is properly cured. In step 1108, mechanical pressing device 1214 and air delivery arrangement 1228 are removed. Mechanical pressing device 1214 and air delivery arrangement 1228 may be combined in a single equipment. In step 1109, the bonded structure, which is reinforcement structure 1206 mounted to camera module 1208, is removed from base tray 1202.

Base tray 1202 may have bores 1232 to accept solder balls 1230 of camera module 1208. The depth D 1236 of bore 1232 controls the distance between the bottom edge of reinforcement structure 1206 and the tip of solder ball 1230. Since the reinforcement structure is mounted to the camera module, and later the bonded reinforcement structure and camera module are jointly fixed to the PCB, the wafer-level camera module is protected by the reinforcement structure from mechanical stress, and accordingly it will be more likely pass a drop test in the manufacturing process.

The order in which some or all of the process blocks appear in process 1100 should not be deemed limiting. Rather, one of ordinary skill in the art having the benefit of the present disclosure will understand that some of the process blocks may be executed in a variety of orders not illustrated.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A reinforcement structure for protecting a wafer-level camera module, the reinforcement structure comprising:
   a quadrilateral top sheet element to be disposed over a top surface of the camera module, wherein the top sheet element includes a first opening for allowing light to pass through to the camera module;
   a plurality of side sheet elements coupled to the top sheet element for securing the reinforcement structure to a printed circuit board (PCB), each side sheet element extending perpendicularly from the quadrilateral top sheet element and coupled to a respective side of the quadrilateral top sheet element, wherein the plurality of side sheet elements includes:
   two long side sheet elements facing each other; and
   two short side sheet elements facing each other, wherein a distance between the two long side sheet elements is greater than a distance between the two short side sheet elements; and
   a second opening in at least one of the plurality of side sheet elements, configured to allow an adhesive to be dispensed through the second opening to adhere the reinforcement structure to the camera module.

2. The reinforcement structure of claim 1, wherein the second opening is a slot in the side sheet element.

3. The reinforcement structure of claim 1, wherein the second opening is a slot in the side sheet element and in the top sheet element.

4. The reinforcement structure of claim 1, wherein the top sheet element and the side sheet element comprise metal.

5. The reinforcement structure of claim 1, wherein a thickness of the top sheet element is substantially equal to a thickness of the side sheet element.

6. The reinforcement structure of claim 1, wherein adjacent side sheet elements are spaced apart at a side edge of the reinforcement structure.

7. The reinforcement structure of claim 1, wherein a bottom edge of the side sheet element includes a plurality of legs for soldering the side sheet element to the PCB.

8. A reinforcement structure for protecting a wafer-level camera module, the reinforcement structure comprising:
   a top means to be disposed over a top surface of the wafer-level camera module for protecting and reinforcing the camera module and for allowing light to pass through to the camera module;
   a plurality of side means coupled to the top means for protecting and reinforcing the camera module and for securing the reinforcement structure to a printed circuit board (PCB), each side means extending perpendicularly from the top means and coupled to a respective side of the top means, wherein the plurality of side means includes:
   two long side means facing each other; and
   two short side means facing each other, wherein a distance between the two long side means is greater than a distance between the two short side means; and
   an adhesive means for allowing adhesive to be dispensed through the side means to adhere the reinforcement structure to the camera module.

9. The reinforcement structure of claim 8, wherein the top means and the side means comprise metal.

10. The reinforcement structure of claim 8, wherein adjacent side means are spaced apart.

11. The reinforcement structure of claim 8, wherein the side means includes soldering means for soldering the side means to the PCB.

12. An apparatus, comprising:
    a wafer-level camera module having a lens cube and a complementary metal oxide semiconductor (CMOS) sensor package; and
    a reinforcement structure for protecting the camera module, the reinforcement structure comprising:
    a rectangular top sheet element disposed over a top surface of the camera module, wherein the top sheet element includes an opening for allowing light to pass through to the camera module;
    four side sheet elements extending perpendicularly from the top sheet, each side sheet element coupled to a respective side of the rectangular top sheet element, wherein adjacent side sheet elements are spaced apart at a side edge of the reinforcement structure, and wherein the top sheet element and the four side sheet elements each comprise metal;
    legs included in a bottom edge of at least two of the side sheet elements for soldering the at least two side sheet elements to a printed circuit board (PCB);
    adhesive disposed between the at least two side sheet elements and the camera module for adhering the reinforcement structure to the camera module; and
    a vertical slot in each of the at least two side sheet elements, configured to allow the adhesive to be dispensed through the vertical slot.

13. The apparatus of claim 12, wherein the four side sheet elements include:
    two long side sheet elements facing each other on two opposite sides of the rectangular top sheet element; and
    two short side sheet elements facing each other on another two opposite sides of the rectangular top sheet element, wherein a distance between the two long side sheet elements is greater than a distance between the two short side sheet elements such that the two long side sheet elements conform to the sensor package and the two short side sheet elements conform to the lens cube.

14. The apparatus of claim 12, wherein the rectangular top sheet element is disposed over the top surface of the camera module free of adhesive therebetween.

15. A method of reinforcing a wafer-level camera module, the method comprising:
- disposing a reinforcement structure over the camera module, wherein the reinforcement structure comprises:
  - a top sheet element disposed over a top surface of the camera module, wherein the top sheet element includes a first opening for allowing light to pass through to the camera module;
  - a side sheet element coupled to the top sheet element for securing the reinforcement structure to a printed circuit board (PCB); and
  - a second opening in the side sheet element;
- dispensing adhesive through the second opening to adhere the reinforcement structure to the camera module;
- applying and maintaining a first force on the reinforcement structure to prevent movement of the reinforcement structure until the adhesive is substantially cured, wherein applying and maintaining the first force includes positioning a press pin on the top sheet element; and
- applying and maintaining a second force on the camera module to substantially prevent movement of the camera module until the adhesive is substantially cured, wherein applying and maintaining the second force includes applying a stream of air to the top surface of the camera module through the first opening.

* * * * *